(12) United States Patent
Honeck et al.

(10) Patent No.: US 8,864,084 B2
(45) Date of Patent: Oct. 21, 2014

(54) RAILWAY TRACK SWITCH COVER SYSTEM

(75) Inventors: Randall G. Honeck, Maple Grove, MN (US); Michael Payne, Plymouth, MN (US)

(73) Assignee: Railway Equipment Company, Inc., Plymouth, MN (US)

( * ) Notice: Subject to any disclaimer, the term of this patent is extended or adjusted under 35 U.S.C. 154(b) by 140 days.

(21) Appl. No.: 13/606,314

(22) Filed: Sep. 7, 2012

(65) Prior Publication Data

US 2013/0240680 A1    Sep. 19, 2013

Related U.S. Application Data

(60) Provisional application No. 61/531,983, filed on Sep. 7, 2011.

(51) Int. Cl.
| | | |
|---|---|---|
| *E01B 7/00* | (2006.01) | |
| *F16M 13/02* | (2006.01) | |
| *E01B 7/20* | (2006.01) | |
| *B61L 5/00* | (2006.01) | |

(52) U.S. Cl.
CPC ............... *B61L 5/00* (2013.01); *F16M 13/022* (2013.01); *E01B 7/20* (2013.01)

USPC ............... 246/415 R; 246/428; 238/2; 238/8

(58) Field of Classification Search
USPC ............................ 246/415 R, 428; 238/2, 8
See application file for complete search history.

(56) References Cited

U.S. PATENT DOCUMENTS

| | | | | |
|---|---|---|---|---|
| 1,153,166 | A * | 9/1915 | Knowles | 238/8 |
| 1,661,040 | A * | 2/1928 | Gervasio | 246/428 |
| 1,758,519 | A * | 5/1930 | Janville | 246/415 R |
| 3,312,820 | A * | 4/1967 | Watkins | 246/428 |
| 4,093,120 | A * | 6/1978 | Canfield | 238/8 |
| 4,671,475 | A * | 6/1987 | Widmer | 246/428 |
| 5,018,690 | A * | 5/1991 | Widmer | 246/428 |
| 6,196,470 | B1 * | 3/2001 | Neumann | 238/8 |
| 2010/0147966 | A1 * | 6/2010 | Hughes et al. | 238/8 |
| 2011/0215164 | A1 * | 9/2011 | Neumann | 238/8 |
| 2011/0253844 | A1 * | 10/2011 | Ferryman et al. | 246/428 |
| 2013/0240680 | A1 * | 9/2013 | Honeck et al. | 246/415 R |

* cited by examiner

*Primary Examiner* — Jason C Smith
(74) *Attorney, Agent, or Firm* — Merchant & Gould P.C.

(57) ABSTRACT

The present disclosure provides a track switch cover system and method. The system and method allows for easy installation and removal of track switch covers as well as quick and easy access to the switch mechanism shrouded by the covers.

4 Claims, 16 Drawing Sheets

RAILWAY TRACK SWITCH COVER SYSTEM

CROSS REFERENCE TO RELATED APPLICATIONS

This application claims priority to U.S. Provisional Application Ser. No. 61/531,983 filed Sep. 7, 2011, the entire disclosure of which is incorporated herein in its entirety.

TECHNICAL FIELD

Cover assemblies for railroad track switch to control snow and ice accumulation on the track switch mechanism.

BACKGROUND

Track switches are mechanism that are used to direct trains from one track to another track. These mechanisms have a number of moving parts. The switching mechanisms work best when they are not covered by ice and snow. Heating units are sometime provided at the track switch to melt away or prevent snow and ice accumulation. Covers are also used in conjunction with the heating units or alone to limit snow and ice accumulation on the track switches. There is a need for improved cover assemblies that facilitate quick and easy access to the switching mechanism, quick and easy installation and removal.

SUMMARY

The present disclosure provides a track switch cover system and method. The system and method allows for easy installation and removal of track switch covers as well as quick and easy access to the switch mechanism shrouded by the covers.

DETAILED DESCRIPTION

Figure 1:
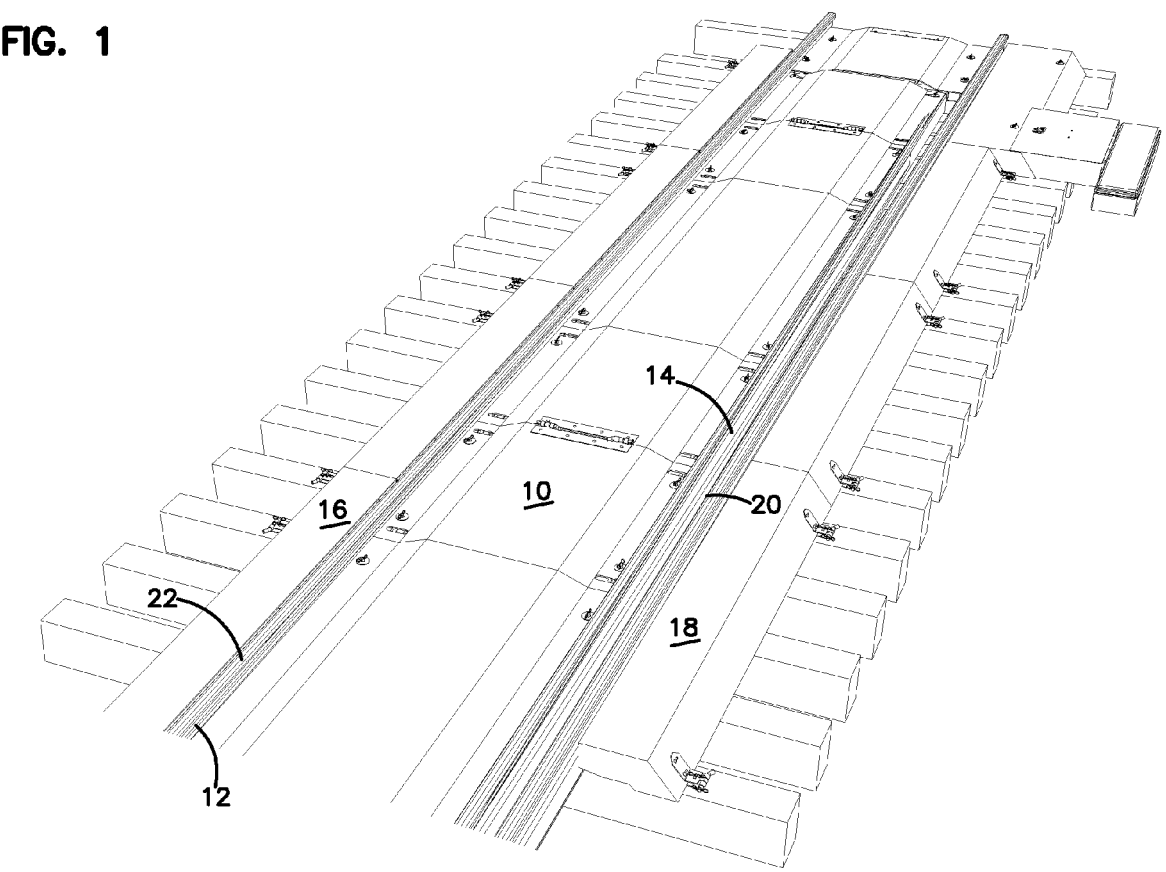
FIG. 1 is a first perspective view of a track switch cover assembly in accordance with an embodiment of the present disclosure installed at a track switch location.
Figure 2:
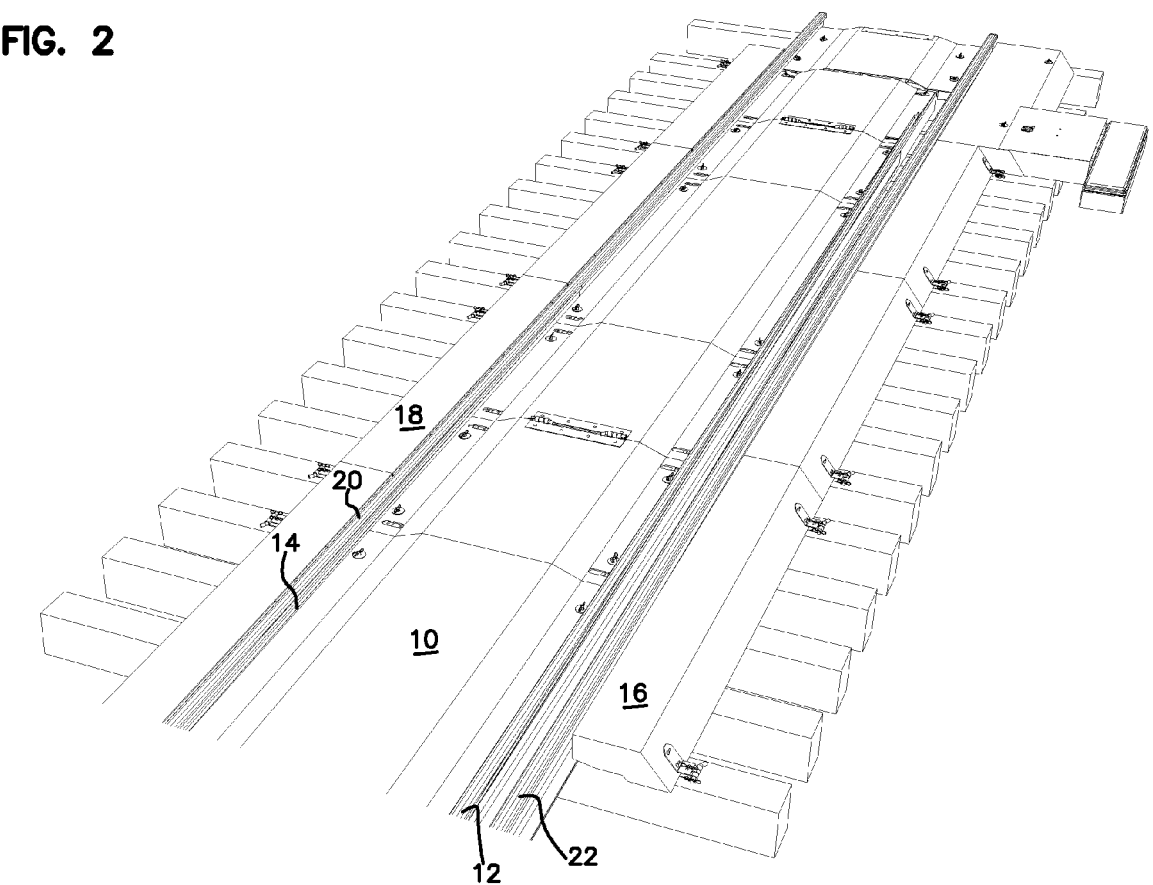
FIG. 2 is a second perspective view of the track switch cover assembly of FIG. 1.
Figure 3:
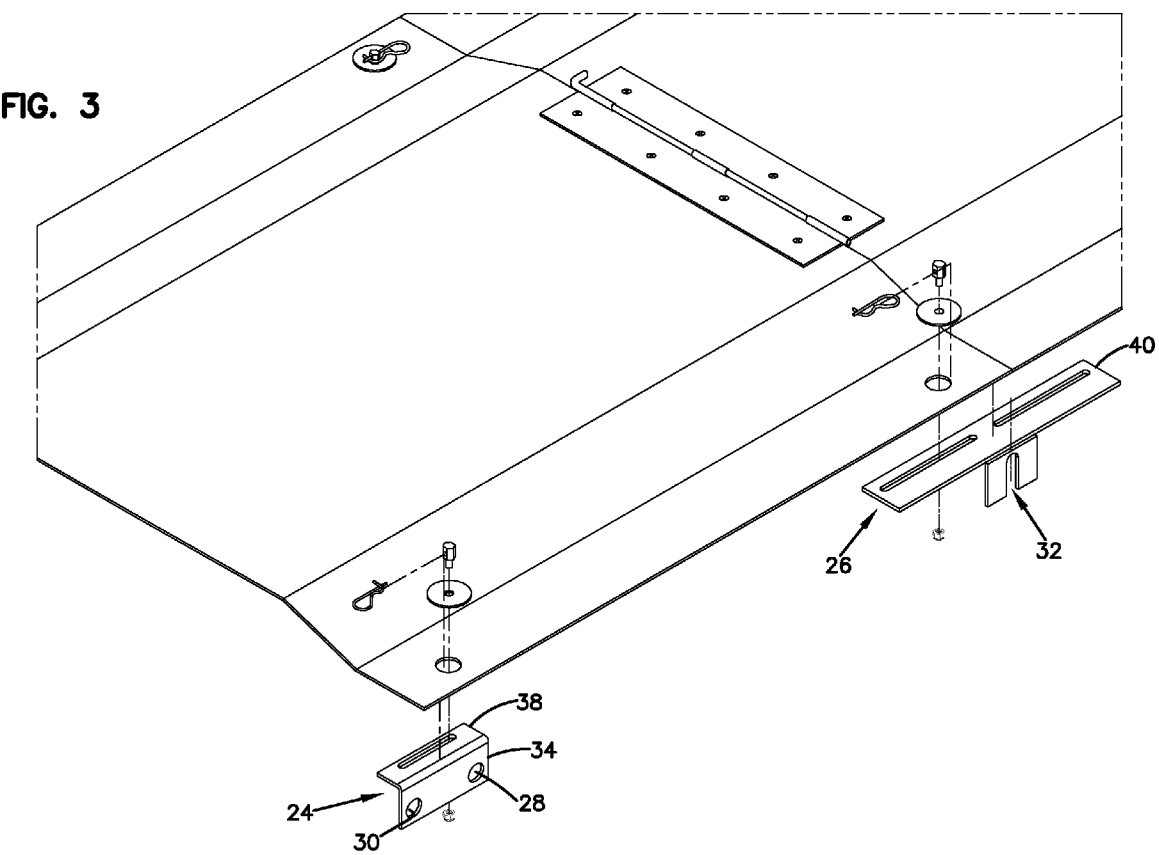
FIG. 3 is an exploded view of a center portion of the track switch cover assembly of FIG. 1.
Figure 4:
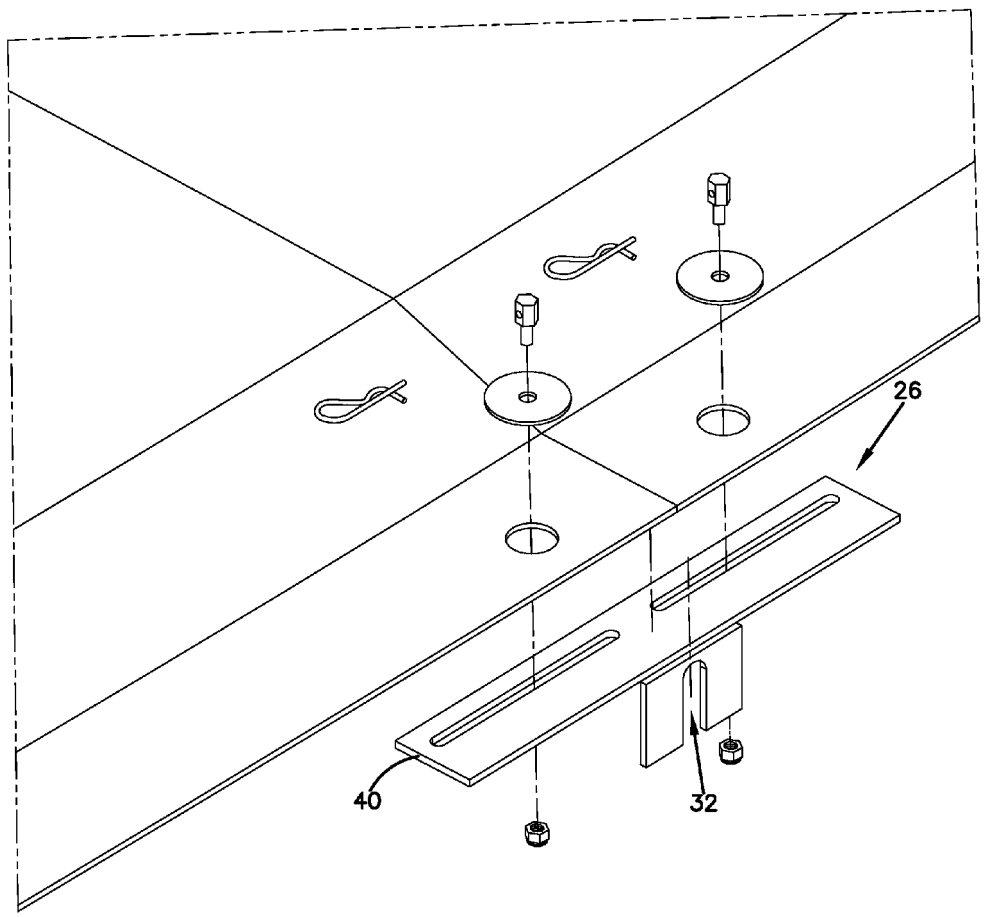
FIG. 4 is an enlarged exploded view of several components shown in FIG. 3.

Referring to FIGS. 1-2, the track switch cover assembly of the present disclosure is described in more detail. In the depicted embodiment the track switch cover system includes a center cover portion 10 that extends between the two inner opposed track rails 12, 14 and a side cover portion 16, 18 that extends adjacent to the field side (outside side) of opposed outer track rails 20, 22. The center cover portion 10 and side cover portions 16, 18 together minimize snow and ice build-up in the track switch area. The cover portions according to the present disclosure are configured to be quickly and easily installed, removed for summer and service, and reinstalled for winter.

Referring to FIGS. 3-7, the center cover portion is described in greater detail. In the depicted embodiment the center cover portion 10 includes a number of individual cover sections that are arranged end-to-end to cooperatively cover the area between the opposed inner track rails 12, 14. In the depicted embodiment some cover sections have a one-piece construction, whereas other cover sections are made of two pieces that are attached to each other via a hinged connection.

In the depicted embodiments the center cover portions are attached to the opposed inner track rails 12, 14 via a number of mounting flange configurations including single slot flange 24 and a double slot flange 26 that are secured to the rails via bolts (FIGS. 3-7) as well as flanges that connect to the rails without bolts (FIGS. 12-20). Each of the depicted embodiments will be described in greater detail below. However, it should be appreciated that certain features from these various embodiments can be combined in different ways than depicted.

Referring first to FIGS. 3-7, both the single slot and double slot flanges are further described. In the depicted embodiment the flanges are bolted to the gauge side of the inner rails 12, 14. In the depicted embodiment the flanges 24, 26 are attached via bolts that extend either through aperture 28, 30 in a first portion 34 of the flange or via bolts that engage a downwardly open channel 32 in a first portion 36 of the flange.

In the depicted embodiment both the single and double slot flange embodiments 24, 26 include second portions 38, 40 that extend from the first portions 34, 36 inwardly towards the center of the track. The second portions engage and support the center cover portion 10. A quick disconnect fastener assembly is configured to extend through the covers and engage the flanges anywhere along the slots. The slots allow for faster assembly and disassembly as they do not require precise alignment between the flanges and apertures in the covers. On the depicted embodiment the slots are longitudinal and generally parallel to the rails. However, it should be appreciated that other slot configurations are also possible.

In the depicted embodiment the quick disconnect fastener assembly includes a stud 44, a pin 46, a washer 48, and a nut 50. An upper end of the stud 44 aligns with an aperture in the covers, and the lower end of the stud 44 is tightened to the slot via the nut 50 upon initial installation. The covers are secured to the stud with the washer 48 and pin 46 combination. In the depicted embodiment the wafer is relatively large which allows the stud 44 to be relatively small in diameter in comparison to the width of the slot. The difference between the stud 44 diameter and the slot width allow for more flexibility in the fit and easier assembly and disassembly. In the depicted embodiment the cover can be disconnected from the flanges 24, 26 by simply pulling the pin 48 out of engagement with the stud 44. Re-securing the cover to the flange involves aligning the aperture in the cover with the stud and engaging the washer and pin to the stud after the cover is properly situated on the flange. It should be appreciated that other quick disconnect fastener assemblies exist that do not use pins and studs. For example, in an alternative embodiment the quick disconnect fastener assembly includes wing nuts that engage threaded posts.

Referring to FIGS. 8-11, the side covers and side cover mounting assembly are described in further detail. In the depicted embodiment the side covers 16, 18 are configured to pivot outwardly from their secured position to expose the area adjacent the outside of the tracks 20, 22. In the depicted embodiment the side cover mounting assembly includes a base member 52 that is pivotally connected to a cover mounting member 54 via a pivot pin 56. In the depicted embodiments the cover mounting member is fastened to the cover.

In the depicted embodiments the base member is either directly secured to a railroad tie or secured to a railroad tie via a base plate 64. In the depicted embodiment, nuts 68 and bolts 66 are used to secure base member 52 to the base plate 64; otherwise, lag bolts can be used to secure the base member 52 directly to the railroad tie. In the depicted embodiments the base member 52 includes a post or stud 58 that extends through an aperture in the cover mounting member 54. The cover mounting member 54 is fastened to the covers 16, 18 via fasteners 70, 72 that extend through the cover and slot shaped apertures 74, 76 in the cover mounting member 54. The slot shaped apertures 74, 76 allow for quicker installation as precise alignment between apertures in the covers 16, 18 and apertures in the cover mounting member 54 is not required. The pivot pin 56 engages and pivotally connects the base member 52 with the cover mounting member 54. Pivot pin 56 is secured in place with a first retaining pin 62. A second retaining pin 60 engages the post 58 and limits movement between the base member 52 and the cover mounting member 58.

In the depicted embodiments the side covers 16, 18 can be detached by simply disengaging the first retaining pin 62 and removing the pivot pin 56. Alternatively, the side covers 16, 18 can be pivoted outwardly by simply disengaging the second retaining pin 60 and pulling the cover away from the tracks.

Figure 5:
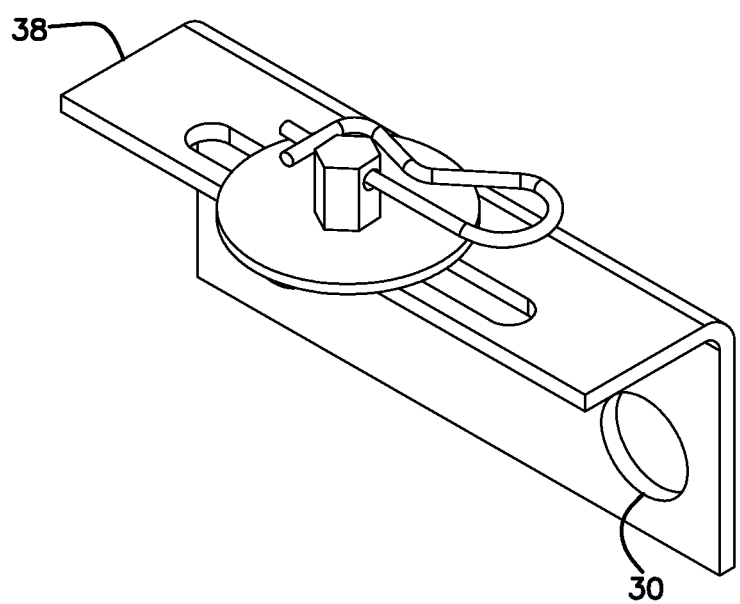
FIG. 5 is a perspective view of mounting components for the cover assembly of FIG. 3.
Figure 6:
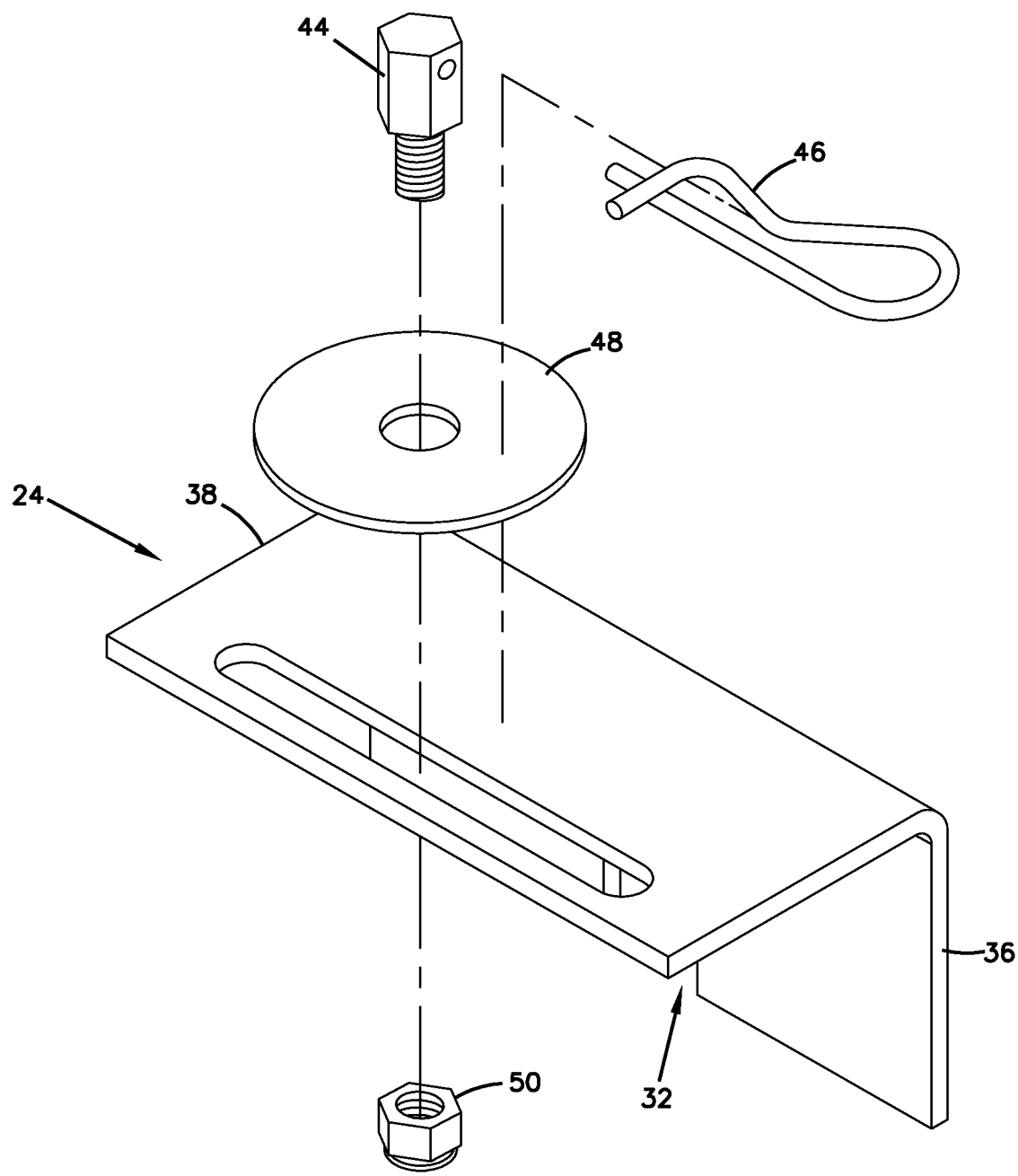
FIG. 6 is an enlarged exploded view of the components shown in FIG. 5.
Figure 7:
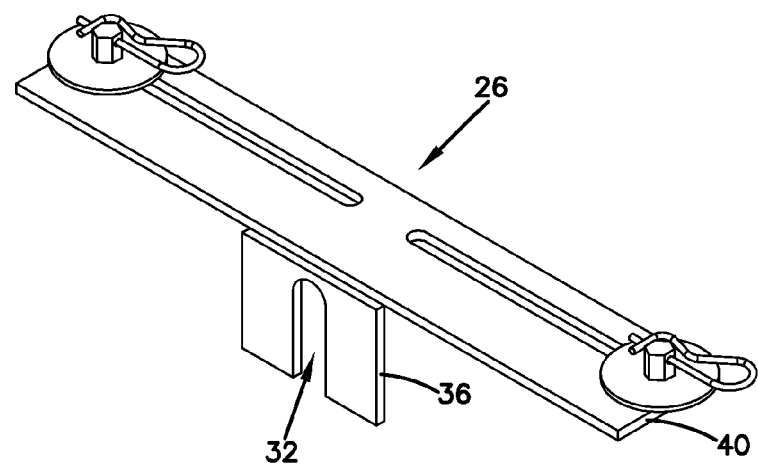
FIG. 7 is a perspective view of mounting components for the cover assembly of FIG. 3.
Figure 8:
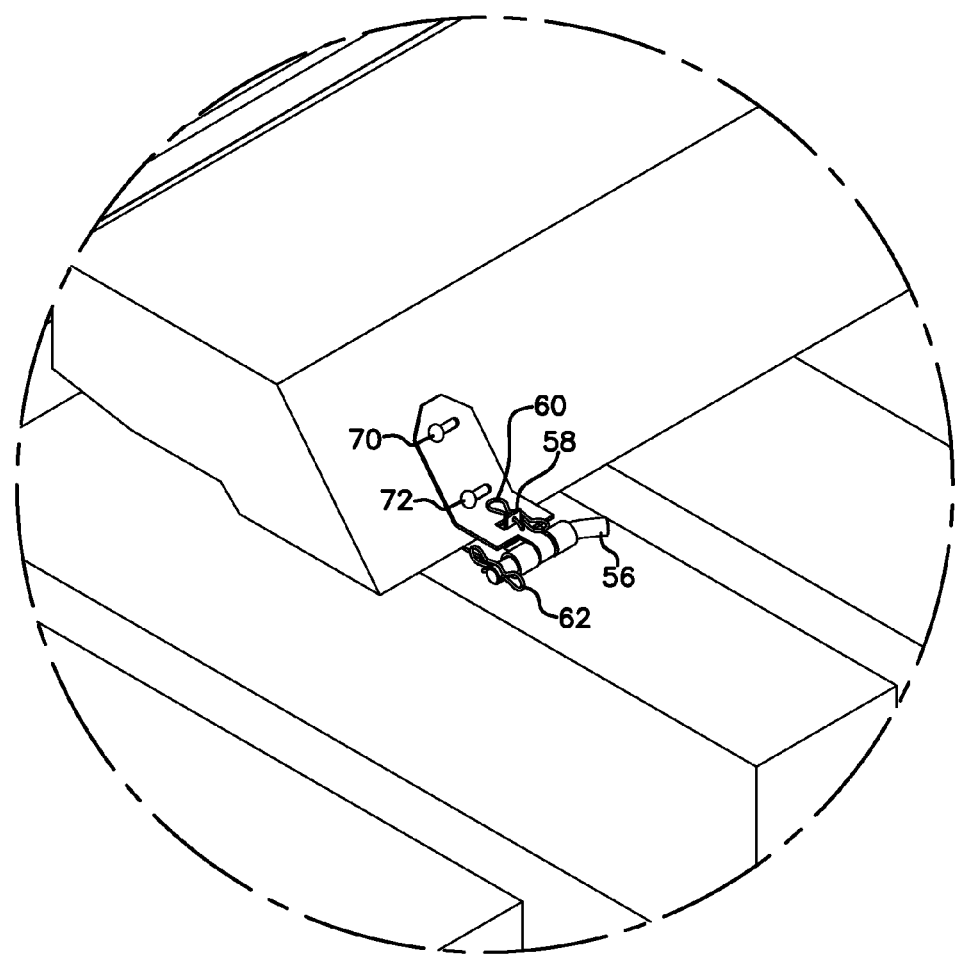
FIG. 8 is a top view side portion of the track switch cover assembly shown in FIG. 1.
Figure 9:
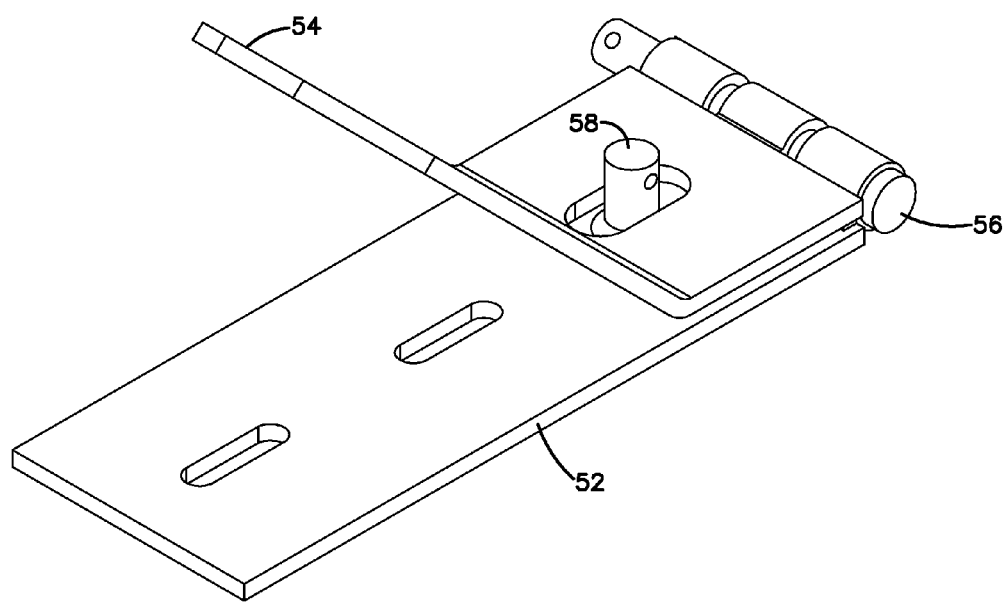
FIG. 9 is a perspective view of the mounting components shown in FIG. 8.
Figure 10:
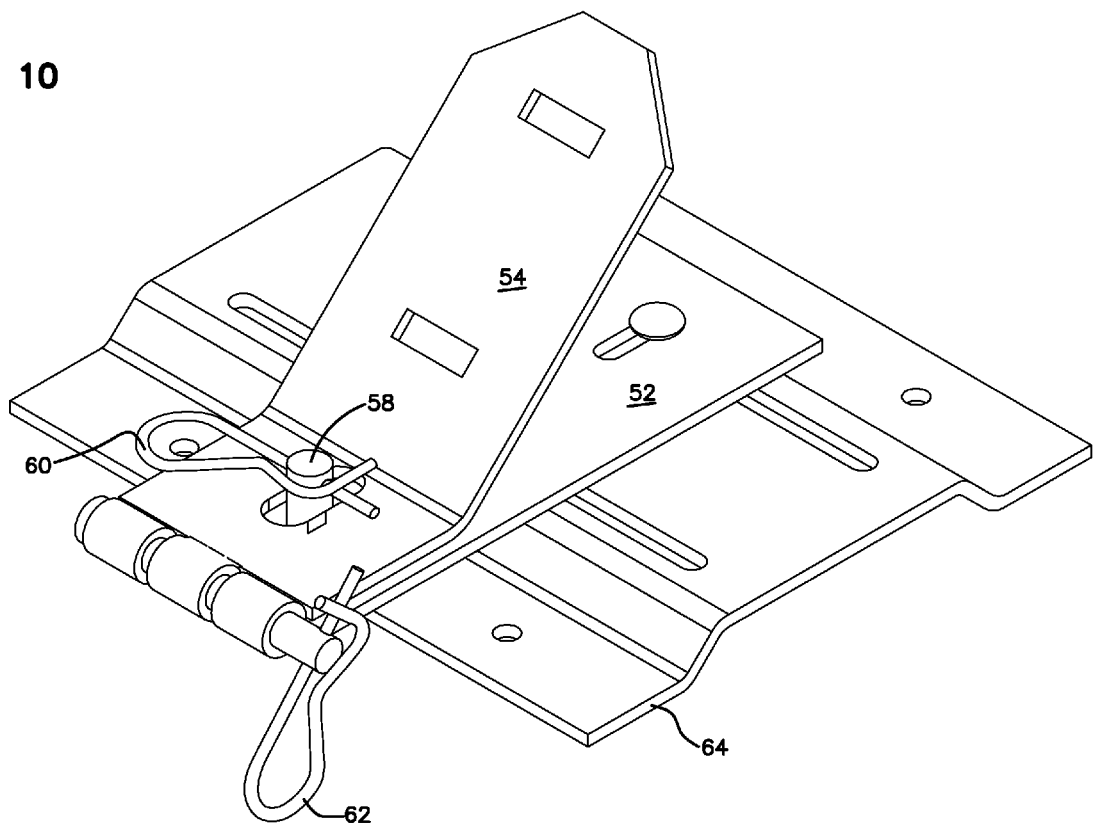
FIG. 10 is a perspective view of an alternative embodiment of the mounting components shown in FIG. 9.
Figure 11:
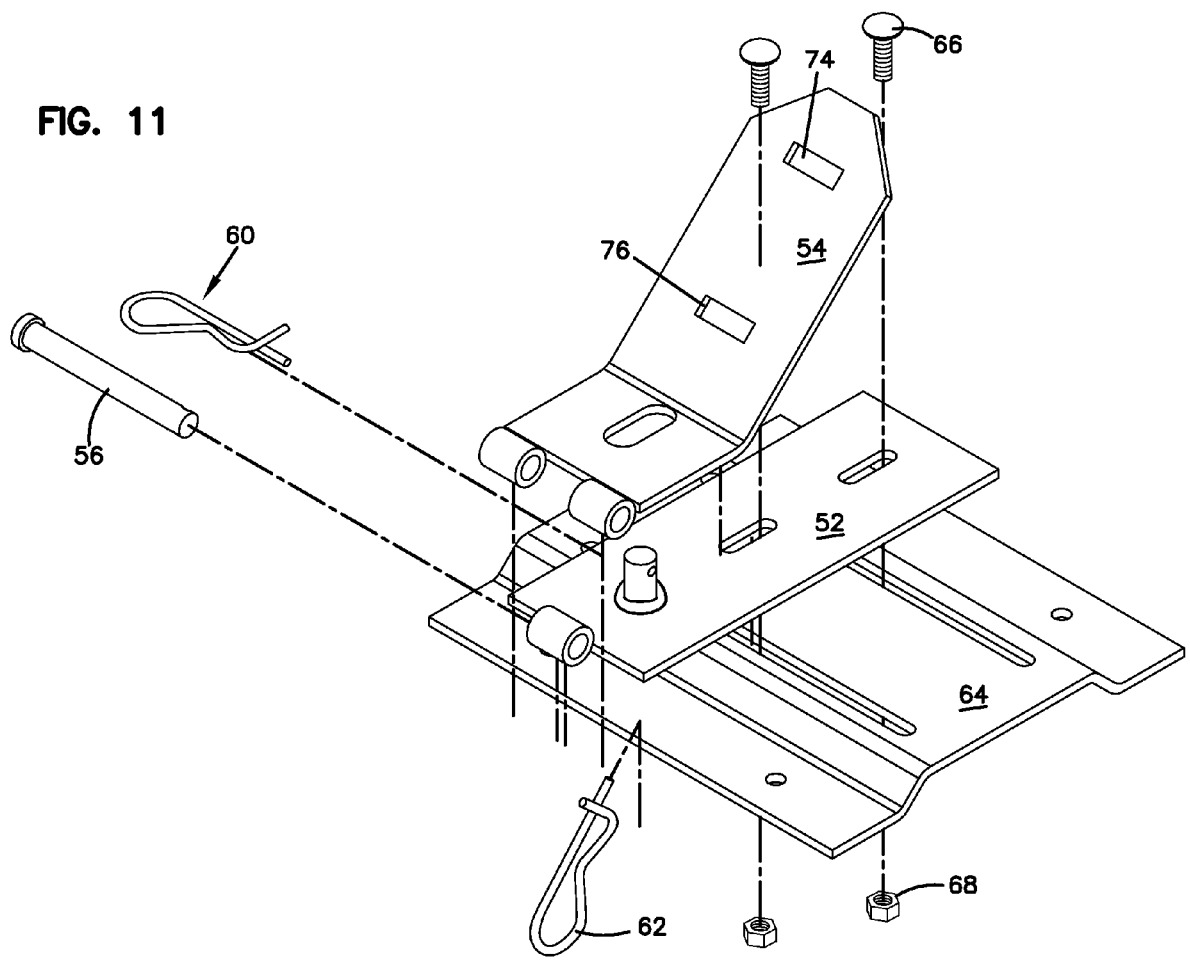
FIG. 11 is an exploded view of the mounting components shown in FIG. 10.
Figure 12:
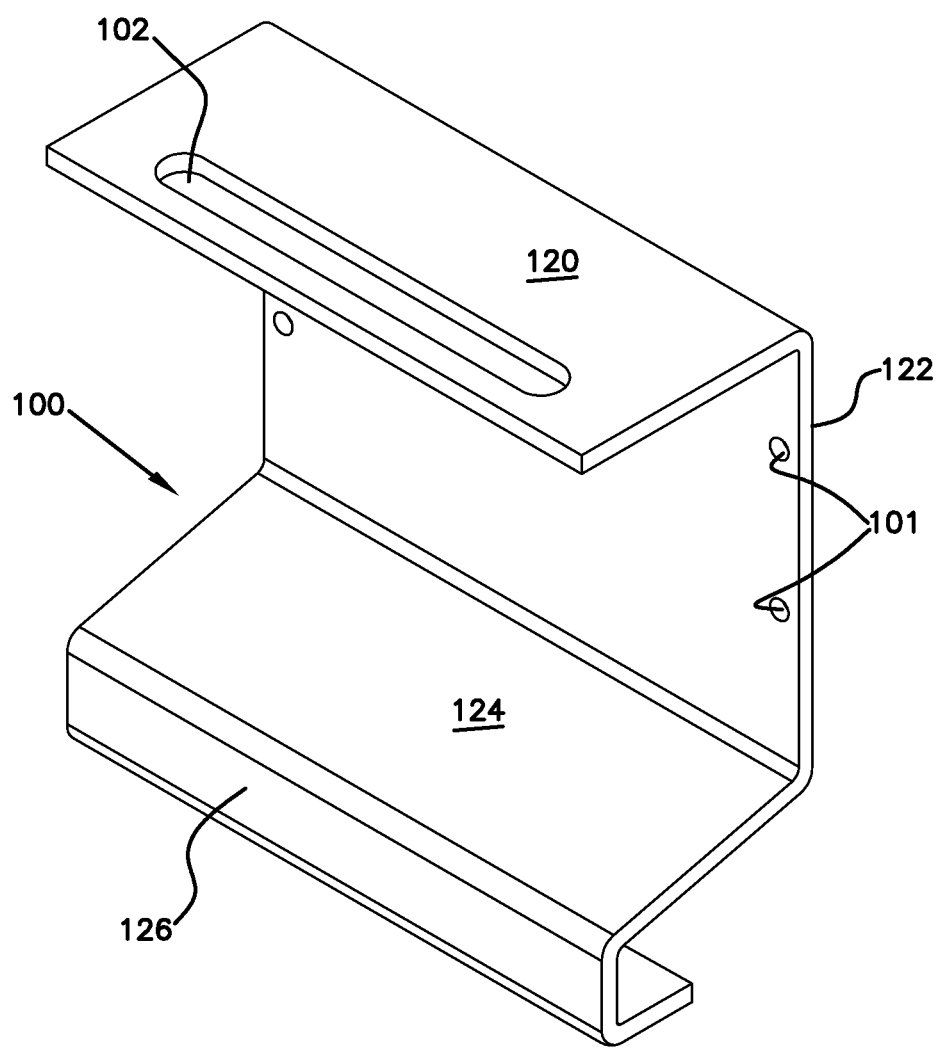
FIG. 12 is a front perspective view of an alternative embodiment of the mounting components shown in FIG. 5.
Figure 14:
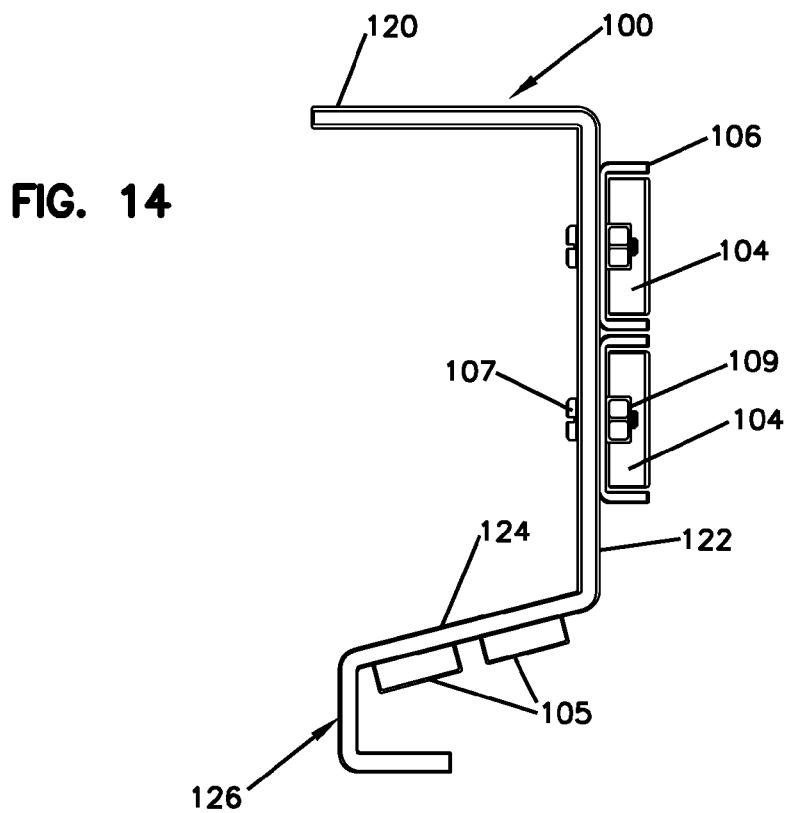
FIG. 14 is an end view of the mounting components of FIG. 12.
Figure 13:
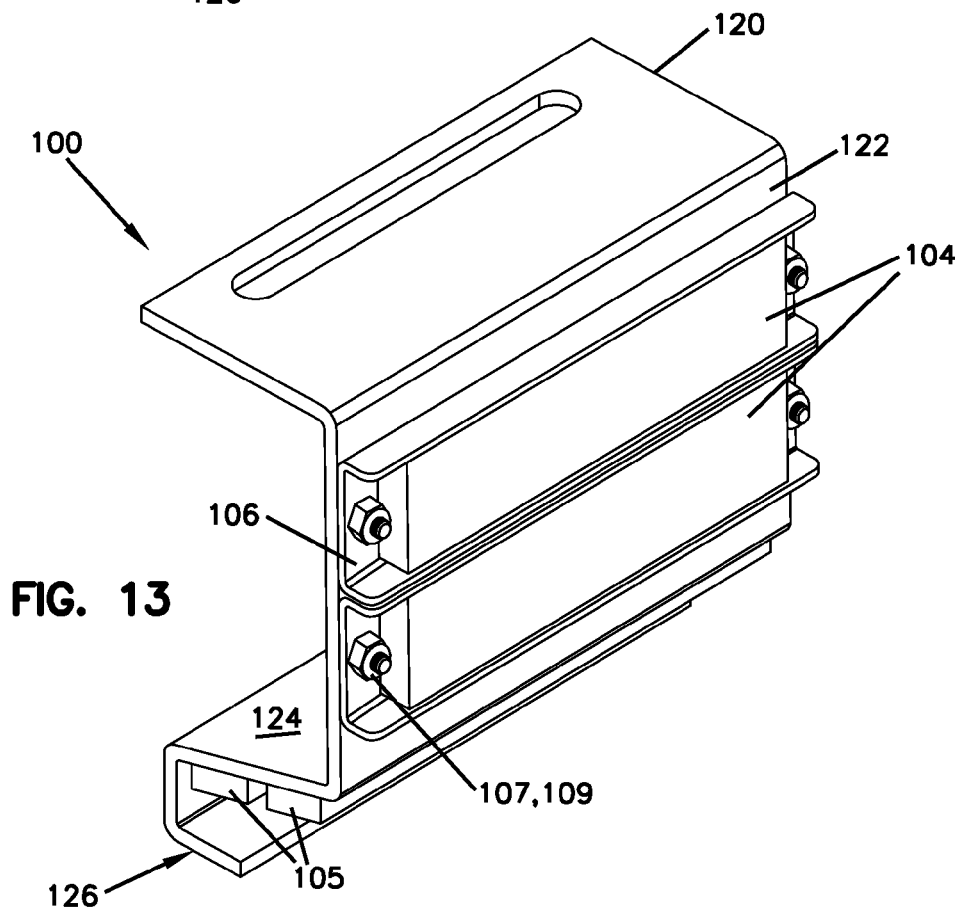
FIG. 13 is a rear perspective view of an alternative embodiment of the mounting components shown in FIG. 5.
Figure 15:
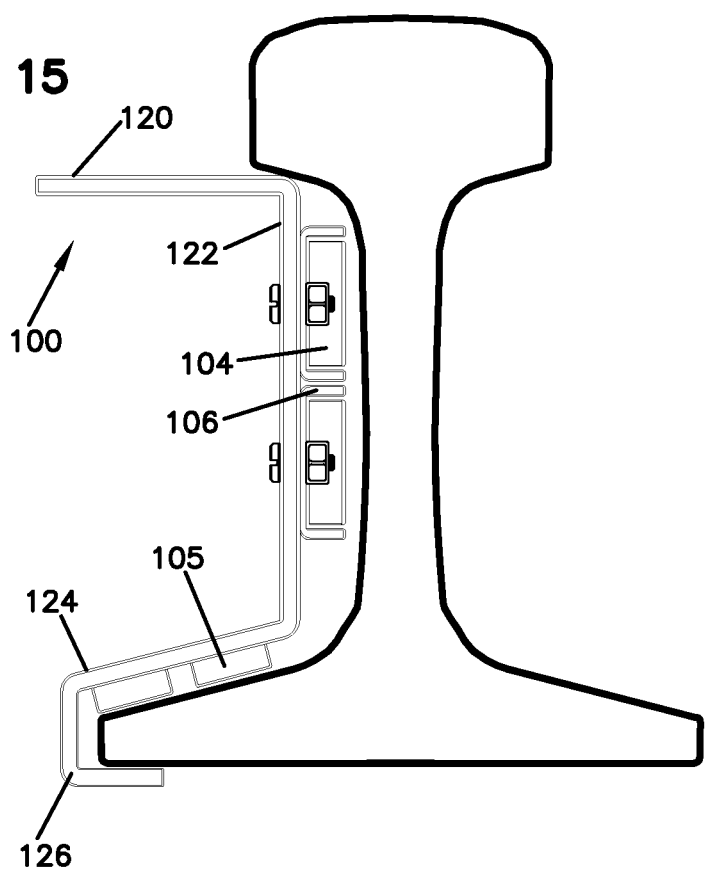
FIG. 15 is an end view of the mounting components of FIG. 12 mounted to a stationary rail.
Figure 16:
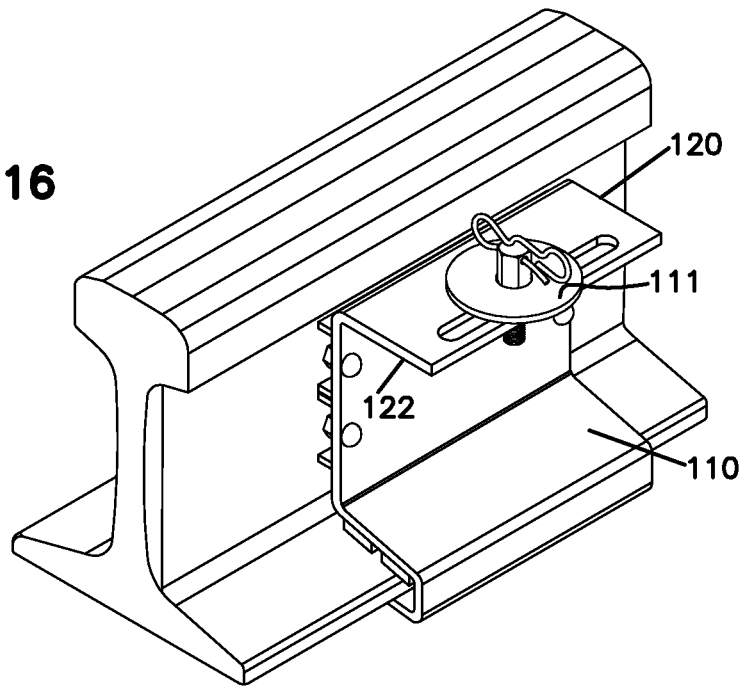
FIG. 16 is a perspective view of the mounting components of FIG. 15 mounted to a moving rail.
Figure 17:
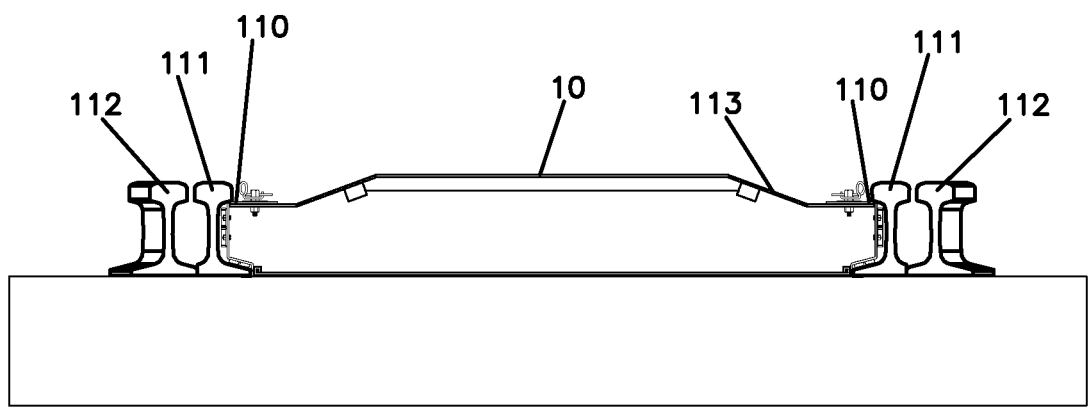
FIG. 17 is an end view of the mounting components of FIG. 12 supporting a track cover.
Figure 18:
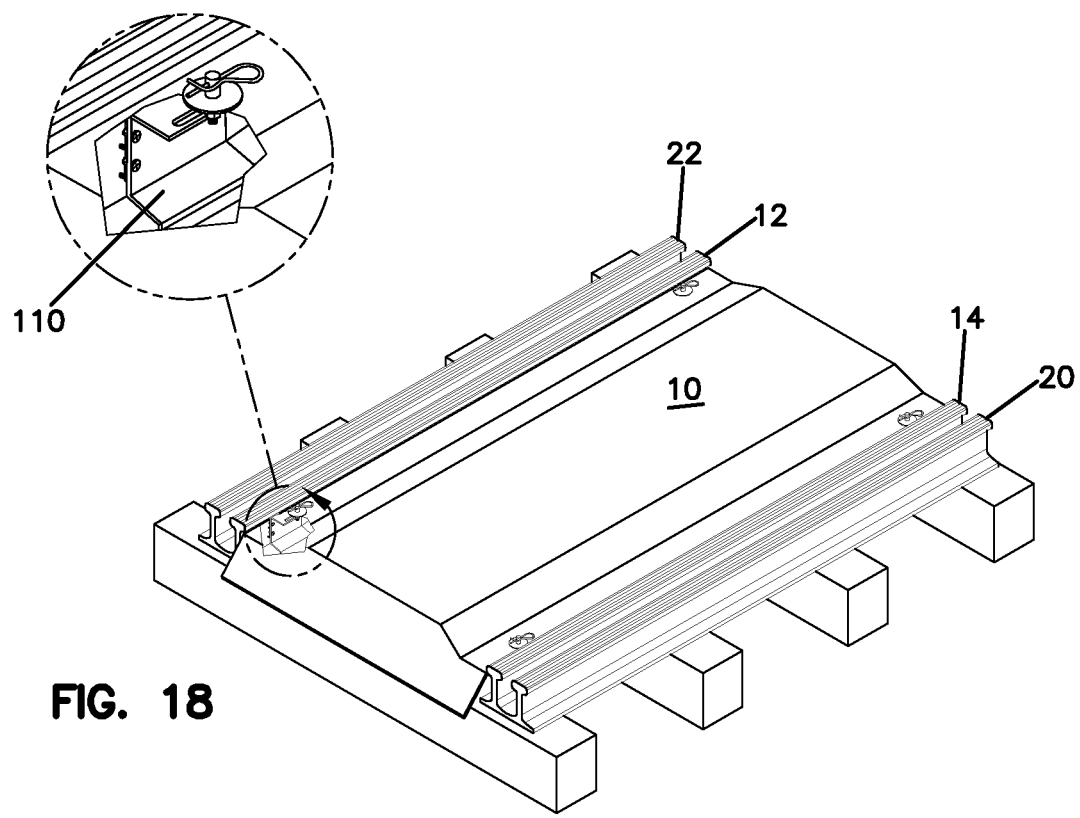
FIG. 18 is a perspective view of the mounting components of FIG. 12 supporting a track cover.

Referring to FIGS. 12-18, an alternative embodiment of bracket assembly depicted in FIGS. 5 and 6 is described in greater detail. The depicted bracket assembly is similar to the bracket assembly in FIGS. 5 and 6 with respect to how they interface with the covers. Accordingly, the ease of assembly and disassembly of the covers is shared between these embodiments and will not be re-described below. In the depicted embodiment the brackets can be connected to the rails without the use of tools. Therefore, the alternative embodiment has the added functionality of decreasing the time and effort involved with attaching the brackets (also referred to herein as flanges) to the rails. Also, since the brackets are not bolted to the rails, they can be connected to the rails where there are not bolts or through holes on the rail, which makes them flexible in that they can be connected essentially anywhere along the rail.

In the depicted embodiment the bracket is shaped such that a magnetic force between the side of the rail and the bracket is sufficient to connect the bracket to the rail such that a group of brackets are able to support the track cover mounted thereon. In the depicted embodiment the bracket body is a fabricated or cast bracket whose angles generally follow the contour of the web and foot of the rail. In the depicted embodiment the bracket includes a cover supporting portion 120 that projects generally horizontally (perpendicular to the side of the rail) (see FIGS. 15-17). In the depicted embodiment, this cover supporting portion 120 includes one or more apertures (e.g., longitudinal slot) to engage mounting hardware for mounting the covers via a quick connect fastener assembly.

The bracket 100 also includes a generally vertical rail connection portion 122. In the depicted embodiment the cover supporting portion 120 is generally perpendicular to the rail connection portion 122. In the depicted embodiment the rail connection portion 122 includes a boltless rail connecting assembly, which in the depicted embodiment includes one or more magnets. In the depicted embodiment apertures 101 are provided in the rail connection portion 122 to allow for a fixed or floating or self-centering/self-adjusting mounting of the magnets 104 which apply a force holding the bracket against the rail. It should be appreciated that it is desirable to maximize contact between the rail connection portion 122 and the rail itself to maximize the attractive force between the magnet and the rail. Since the surface profiles of the rail may not be perfectly flat or vertical, it may be desirable to allow the magnets to "float" to move to an orientation that most maximizes the contact between the rail connection portion 122 and the surface of the rail. In one embodiment the magnets 104 are mounted by means of a bracket 106, held in place by nuts 109 and bolts 107. The nuts and bolts can be loosened to allow the brackets 106 some freedom of movement so that the brackets 106 can self-align with the surface of the rail.

The bracket 100 also includes a foot portion 124 that is configured to rest on the base of the rail. In the depicted embodiment the foot portion includes foot pads 105 that interface between the bracket 100 and the base of the rail. The foot pads can be comprised of a high friction material such as rubber. When the weight of the cover is applied to the cover supporting portion 102, force is transferred through the rail connecting portion 122 to the foot portion 124 and through the foot pads 105 to the base of the rail.

In the depicted embodiment the bracket 100 also includes claw portion 126 that is connected to the foot portion 124. The claw portion 126 grabs the edge of the rail and extends under the edge of the rail. The claw portion 126 serves to locate the bracket properly on the rail and also can facilitate the connecting between the bracket 100 and the rail by camming against the bottom surface of the rail when a downward force is applied to the cover supporting portion 120.

Figure 19:
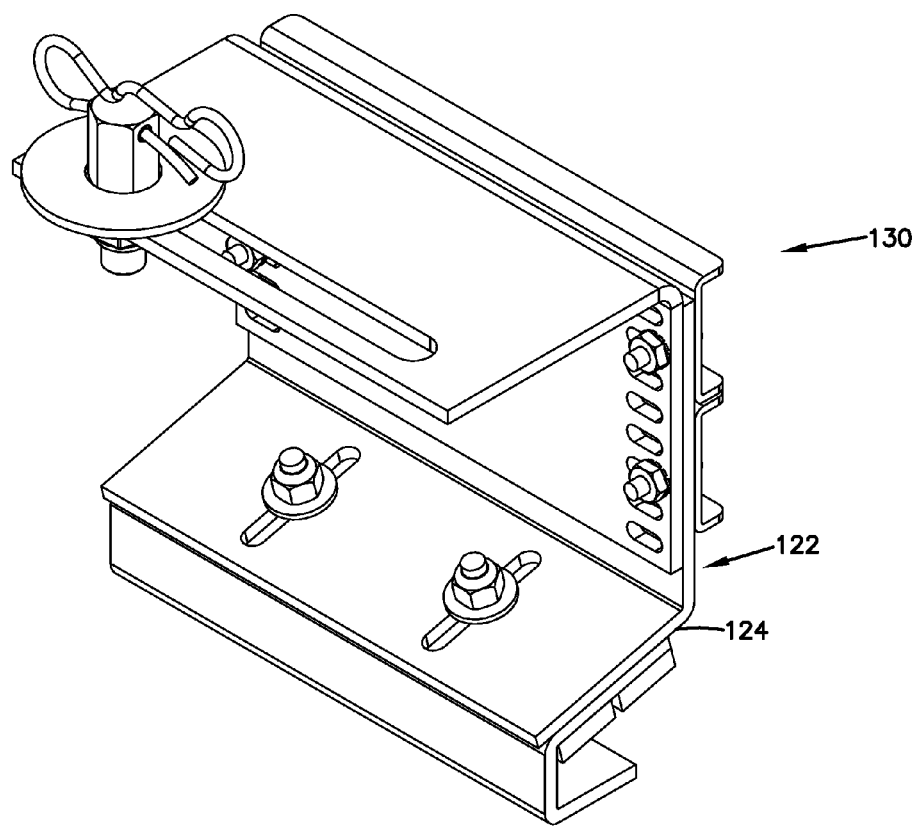
FIG. 19 is a perspective view of another alternative embodiment of the mounting components of FIG. 5.

Referring to FIG. 19, an additional embodiment of the bracket are shown. The bracket 130 shown in FIG. 19 has a rail connecting portion 122 that is adjustable in height in the field. The installer can in the field make the connecting portion 122 taller or shorter as needed. The bracket 130 also has a foot portion 124 that is adjustable in the field. The installer can in the field make foot portion 124 narrower or wider as needed. These adjustments can allow the installer to configure the bracket to maximize the contact between the rail connection portion 122 and the rail and the claw portion 126 and the rail. It should be appreciated that the bracket can be casted or formed of a metal such as steel or aluminum. Alternatively, the bracket can be constructed of a non-conductive material such as nylon, fiberglass, etc. The non-conductive construction can be advantageous when the conduction of electricity between different rails is undesirable. It should also be appreciated that the bracket assembly can be used to mount structures other than covers to the rails (e.g., it can be used to mount sensors to the rails).

The above specification, examples and data provide a complete description of the manufacture and use of the composition of the invention. Since many embodiments of the invention can be made without departing from the spirit and scope of the invention, the invention resides in the claims hereinafter appended.

We claim:

1. A track switch cover assembly comprising:
   a center cover configured to extend between a pair of parallel rails;
   a side cover configured to extend longitudinally adjacent an outside edge of a rail;
   a center cover mounting assembly including:
      a plurality of mounting flanges each including first portions that are configured to be bolted to a gauge side of the rail and a second portion that extends from the first portion inwardly toward the center of the track, the second portion including a slot therein;
      a plurality of studs configured to engage the slots in the second portion of the flange and extend through apertures in the center cover;
      a plurality of quick release fasteners configured to engage the plurality of studs and secure the center cover to the plurality of mounting flanges;
   a side cover mounting assembly including:
      a plurality of base members configured to be secured to a railroad track tie member, each base member including a stud extending therefrom;
      a plurality of pivot members pivotally connected to the base member and secured to the side cover, each pivot member including an aperture therein configured to receive the stud extending from the base member;
      a plurality of quick release fasteners configured to engage the plurality of studs to limit the rotation of the pivot member relative to the base member.

2. The track switch cover assembly of claim 1, wherein the center cover includes a first portion and a second portion, wherein the first and second portions are connected by a hinge that allows the first portion to pivot relative to the second portion, thereby allowing access to an area below the first portion without removing the second portion.

3. The track switch cover assembly of claim 1, wherein the center cover is configured to be released from the tracks by disengaging the plurality of quick release fasteners and secured to the track by engaging the plurality of quick release fasteners.

4. The track switch cover assembly of claim 1, wherein the plurality of studs configured to engage the slots can be secured to the slots after the studs are positioned to extend through the apertures in the cover.

\* \* \* \* \*